O. SHACKELFORD.
METHOD OF ARTIFICIAL INCUBATION.
APPLICATION FILED DEC. 8, 1914.

1,156,374.

Patented Oct. 12, 1915.

Witnesses
Wynne Johnson

Inventor
Orie Shackelford
By C. L. Parker
Attorney

UNITED STATES PATENT OFFICE.

ORIE SHACKELFORD, OF FAIRMONT, WEST VIRGINIA.

METHOD OF ARTIFICIAL INCUBATION.

1,156,374.   Specification of Letters Patent.   Patented Oct. 12, 1915.

Application filed December 8, 1914. Serial No. 876,049.

*To all whom it may concern:*

Be it known that I, ORIE SHACKELFORD, a citizen of the United States, residing at Fairmont, in the county of Marion and State of West Virginia, have invented certain new and useful Improvements in Methods of Artificial Incubation, of which the following is a specification.

My invention relates to an improved method of artificial incubation.

An important object of the invention is to provide means whereby the bad and fertile eggs, upon being subjected to heat suitable for incubation for a period to develop the embryonic chickens in the fertile eggs, may be readily distinguished by the different relative positions assumed by the bad and fertile eggs, thus enabling the bad eggs to be removed from the presence of the fertile eggs.

A further object of the invention is to provide means for pivotally engaging and supporting the eggs at remote points, in a manner to allow the same to tilt upon their transverse axes, whereby the fertile eggs may assume a position oblique to the perpendicular, more or less.

Other objects and advantages of the invention will be apparent during the course of the following description.

My invention is founded upon the discovery that if a fertile egg is pivotally supported, preferably at remote points, so that it is free to tilt upon its transverse axis from its normal substantially horizontal position, upon the development of the embryonic chicken therein, the fertile egg will assume a position oblique to the perpendicular, more or less. The upward tilting of the fertile egg is believed to be due to the formation of an air space in one end of the shell, while the embryonic chicken develops in the opposite end thereof, thus causing the egg to rise. The bad eggs do not tilt upon their transverse axes, whereby they may be readily distinguished from the fertile eggs, and removed from their presence.

My method consists broadly in pivotally supporting the eggs, preferably at remote points, in a manner to permit of the same tilting upon their transverse axes, and preferably turning the eggs upon their longitudinal axes, at suitable intervals, while the eggs are subjected to heat suitable for incubation, and removing the eggs which remain substantially horizontal from the presence of the eggs which tilt to a position oblique to the perpendicular, more or less.

Figure 2:
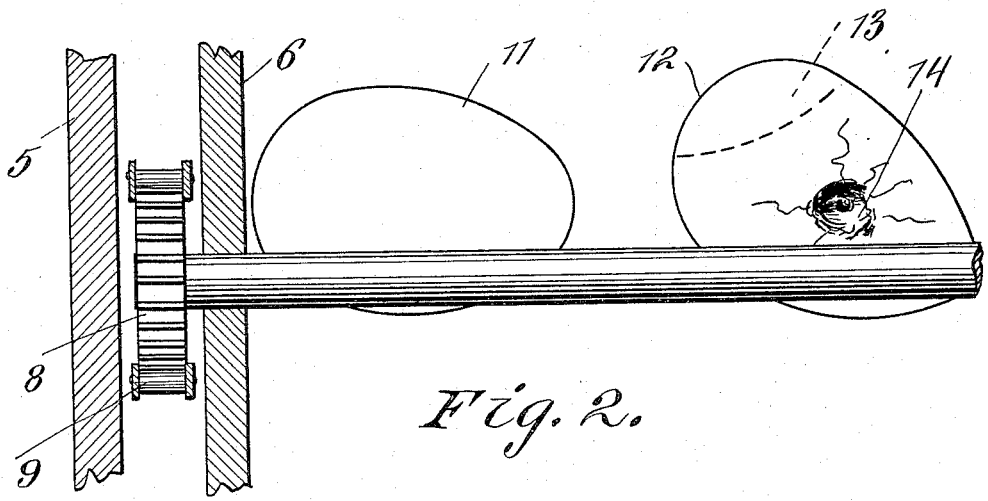
Figure 1:
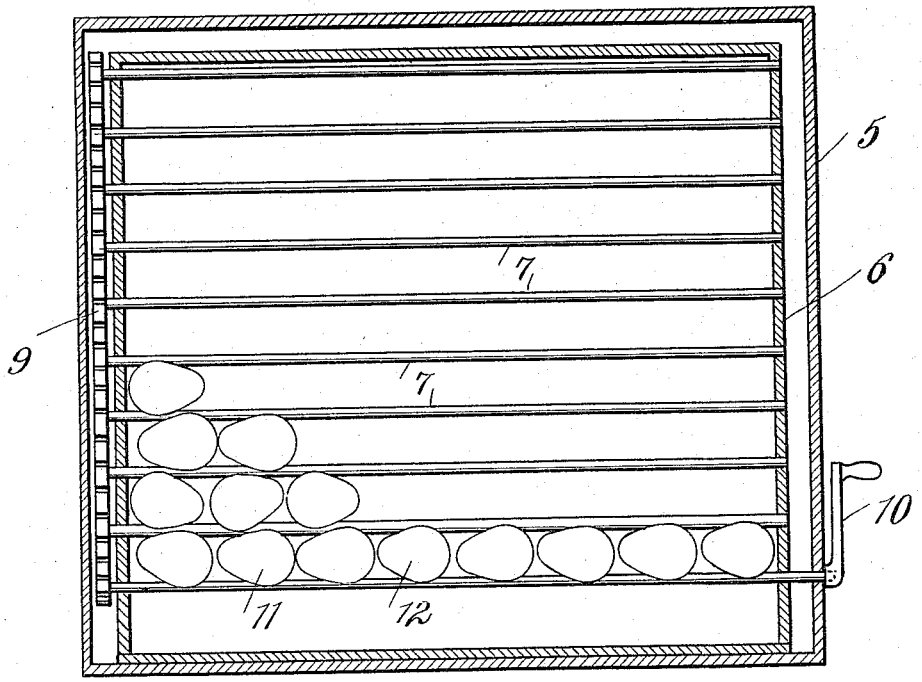

In the accompanying drawings forming a part of this specification and in which like numerals are employed to designate like parts throughout the same, Figure 1 is a plan view of apparatus embodying my invention, and, Fig. 2 is an enlarged fragmentary side elevation of a portion of the same, showing bad and fertile eggs carried thereby.

In the drawings, wherein for the purpose of illustration is shown apparatus suitable for the practice of my method, the numeral 5 designates an incubator chamber, within which is mounted a frame 6, having spaced horizontal rolls, rods, or supporting elements 7, preferably journaled therethrough, as shown. These supporting elements or rods carry at corresponding ends, sprocket wheels 8, engaged by a sprocket chain 9, whereby the same will turn together in the same direction. One end supporting element or rod 7 is preferably extended to the exterior of the incubator chamber 5, for connection with a crank 10, by means of which the supporting elements or rods may be turned. Any other suitable means may be employed to turn the supporting elements or rods, if desired.

The incubator chamber 5 is maintained at a suitable temperature for incubation, by any suitable means, and it is to be understood that any other apparatus may be employed for subjecting the eggs to heat suitable for incubation.

In the practice of my method and operation of the apparatus in connection therewith, the eggs 11 and 12 are arranged upon and between the supporting elements or rods 7, to be supported thereby. These supporting elements or rods, are spaced a substantial distance, allowing the eggs to extend downwardly therebetween and preferably below the same. While the distance between the supporting elements or rods 7 may be varied, within certain limits, yet it is necessary that the same be spaced sufficiently so that the ends of the eggs which tilt downwardly, may pass therebetween without engaging therewith, the same serving to pivotally suspend the eggs at remote points, to turn upon their transverse axes. I have discovered that the fertile eggs, upon the development of the embryonic chickens therein, will tilt upon their transverse axes, assuming a more or less oblique position to the perpendicular, while the bad eggs remain substantially horizontal, thus enabling the bad eggs to be distinguished from the fertile eggs. This tilting of the fertile eggs is believed to be due to the formation of an air space 13 in one end of the egg, while the embryonic chicken 14 is arranged in the opposite end portion thereof, as shown in Fig. 2. The supporting elements or rods 7 are preferably rotated at suitable intervals, for turning the eggs upon their longitudinal axes. This rotation of the eggs upon their longitudinal axes, while not essential for causing the same to vertically tilt, has been found to more or less aid in such tilting, besides being advantageous, for other well known reasons. The eggs are of course subjected to heat suitable for incubation, and when the fertile eggs tilt vertically, the bad eggs which remain substantially horizontal are removed from their presence.

It is to be understood that the form of my invention herewith shown and described is to be taken as a preferred example of the same, and that various changes may be resorted to, without departing from the spirit of the invention or the scope of the subjoined claims.

Having thus described my invention, I claim:—

1. The method of incubating eggs, which consists in pivotally supporting the eggs whereby they are free to tilt upon their transverse axes upon the development of the embryonic chickens therein, maintaining the eggs at a temperature suitable for incubation for a suitable length of time, and removing the eggs which remain substantially horizontal from the presence of the other eggs when the other eggs have tilted to a position oblique to the perpendicular.

2. The hereindescribed method of incubating eggs, which consists in freely pivotally supporting each egg at points arranged upon the opposite sides thereof while the lower portion of the egg is wholly unsupported whereby it is free to tilt upon its traverse axis upon the development of the embryonic chicken therein, maintaining the eggs at a temperature suitable for incubation for a suitable length of time, and removing the eggs which remain substantially horizontal from the presence of the other eggs when the other eggs have tilted to a position oblique to the perpendicular.

In testimony whereof I affix my signature in presence of two witnesses.

ORIE SHACKELFORD.

Witnesses:
H. E. ENGLE,
ROLAND B. WALLIS.